Aug. 14, 1951

H. E. HAYNES 2,564,572

GAIN CONTROL SYSTEM FOR FACSIMILE SCANNING

Filed Oct. 31, 1946

2 Sheets-Sheet 1

INVENTOR
HAROLD E. HAYNES
BY W. S. Grover.
ATTORNEY

Aug. 14, 1951 H. E. HAYNES 2,564,572

GAIN CONTROL SYSTEM FOR FACSIMILE SCANNING

Filed Oct. 31, 1946 2 Sheets-Sheet 2

INVENTOR
HAROLD E. HAYNES
BY H. S. Grover.
ATTORNEY

Patented Aug. 14, 1951

2,564,572

UNITED STATES PATENT OFFICE 2,564,572

GAIN CONTROL SYSTEM FOR FACSIMILE SCANNING

Harold E. Haynes, Indianapolis, Ind., assignor to Radio Corporation of America, a corporation of Delaware Application October 31, 1946, Serial No. 706,924

3 Claims. (Cl. 178—6.6)

The present invention relates to systems for producing an image of scanned subject matter, such as an object or a representation in the form of a picture, document, printed matter, or map, or other form, and, more particularly, but not necessarily exclusively, to a novel arrangement for maintaining a consistent signal level in a facsimile scanning system.

In accordance with the invention a recurring signal reference level of a varying quantity controls the sensitivity of one of the elements of the scanning system so that response to this reference level is maintained. For example, in the embodiment selected for illustrating the invention, a predetermined quantity of light when directed in appropriate manner for scanning a copy area of a definite shade should produce a certain output current in the scanning phototube. If this certain shade is sufficiently recurrent this amount of light can be caused to control the phototube sensitivity so as to produce the desired current. Where the subject matter to be scanned is printed or inscribed on a substantially white piece of paper then white may be selected as the reference level. It will be understood, however, that the background may have other tints or shades.

Accordingly, the principal object of the present invention is to provide a novel arrangement for maintaining a substantially fixed signal level in a facsimile scanning system.

Another object is to provide a novel signal level control which is maintained in operation by a recurrent condition of light intensity.

A further object is to provide a novel signal level control embodying a phototube in combination with a controllable power supply for the phototube.

Still another object is to provide a novel controllable power supply for a multiplier phototube.

Figure 1:
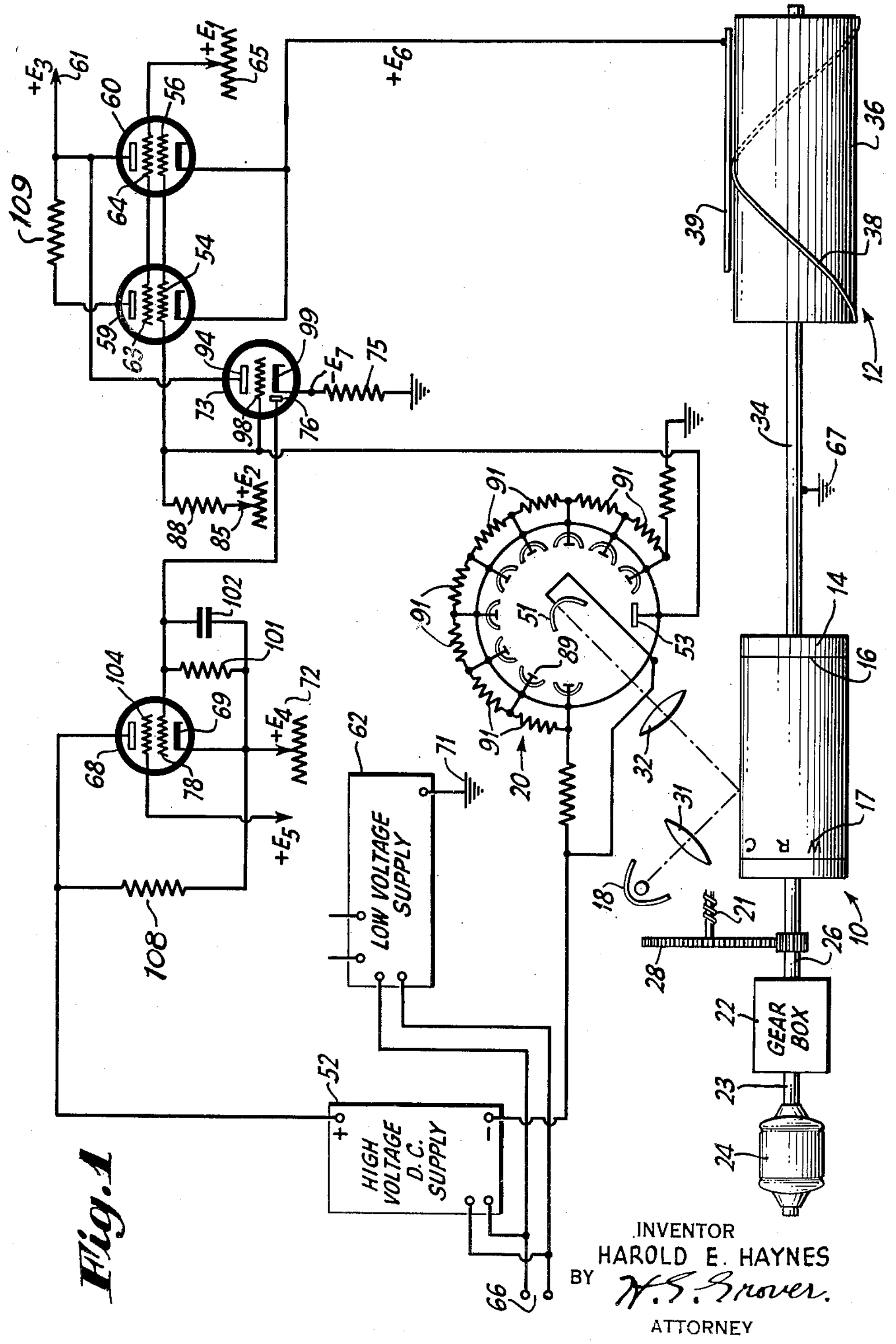

Other objects and advantages of the present invention will, of course, become apparent and immediately suggest themselves to those skilled in the art to which the invention is directed from a reading of the following specification in connection with the accompanying drawings, in which:

Fig. 1 is a schematic showing of a facsimile system embodying the invention and including a transmitting scanner and a recording scanner; and Figs. 2 to 5 are curves referred to in explaining the purpose and operation of the invention.

Referring to Fig. 1 of the drawings there is shown a facsimile system which is operative to scan appropriate subject matter in a transmitting scanner, indicated in its entirety by reference character 10, to produce image currents which serve to operate a recording scanner 12 for the purpose of producing a recorded image of the scanned subject matter. The transmitting scanner 10 may be of any desired kind or type and is shown illustratively as comprising a drum 14 on which is secured the subject matter copy 16 which bears a picture, printed matter or other indicia 17 to be reproduced by the recording scanner or, as it will be called hereinafter, the recorder 12. A facsimile signal generating scanning head which carries a light source 18 and a phototube 20, preferably of the electron multiplier type, is propelled axially along the drum 14 by a lead screw 21. Any suitable change-speed device 22 may, if desired, be used to connect the drive shaft 23 of a driving motor 24 with the driven shaft 26 of the scanner 10. A gear and pinion combination 28 drives the lead screw 21 at the proper relative speed so that closely spaced helical scanning lines are obtained as the scanning head including light source 18 moves axially of the drum 14. It will be understood that the scanning head includes a suitable optical system for imaging a light spot from the light source upon the surface of the drum 14 and hence upon the subject copy 16 secured thereto, and a lens system for collecting a portion of the light reflected from the illuminated spot on the copy 16 and delivering it to the cathode of the phototube 20. The optical system is shown illustratively as comprising two lenses 31 and 32.

The recorder 12 is mechanically driven from the transmitting scanner through a shaft 34, driving power being imparted to a drum 36 in the recorder which carries a helix 38. The helix cooperates with a printer bar 39 in a well known manner to produce marks upon a record sheet (not shown) passing between the helix and the printer bar. A recorder of this general type is shown in U. S. Patent No. Re. 20,152 granted to C. J. Young on October 27, 1936. The recorder in this last named patent relies on transfer of marking material to produce markings by vibrating the printer bar rather than on electrical or other processes which depend upon a direct application of electrical effects to the record sheet. Other details of a facsimile recorder employing an electrolytic process for producing marks are shown in U. S. Patent No. 2,391,765 granted to Maurice Artzt on December 25, 1945.

The mechanical portions of the facsimile system so far described comprise what is usually termed a "facsimile duplicator." However, it will be understood by those skilled in the art that the recorder 12 may be located at a point which is remote from the transmitter and may be driven and maintained in operation synchronously with the transmitter by any well known synchronizing system. Moreover, both the transmitter scanner and the recorder may be of the type shown in U. S. Patent No. 2,354,571 granted on July 25, 1944, to Albert Blain and may include the mechanical refinements shown in this patent and other patents cited therein. Other types of scanning transmitters which may be employed are shown in U. S. Patents Nos. 1,746,407 and 2,298,911 granted to F. Schroeter et al. and C. J. Young on February 11, 1930, and October 13, 1942, respectively.

In accordance with the invention an automatic gain control is disclosed which sets the over-all gain to such a value that the portions of the subject matter being copied, which have the greatest reflectivity for example, will be rendered as "white," for instance, by the recorder. That is, the gain value necessary for any piece of copy is automatically set by its whitest part in the illustrative example of Fig. 1. The electron multiplier phototube 20 is such that it is readily activated by very feeble impinging light intensities and it is in itself capable of operating from D. C. to the highest frequencies which are produced upon scanning a piece of subject copy at high speed. The high sensitivity of a phototube of this type is of great importance in a system of this variety since the light level received from the scanned copy fluctuates in value from zero to perhaps .001 lumen in value. There are several sources of gain variation in the system, chief among them being changes in electrode voltages on the multiplier, changes in multiplier sensitivity with continued use (known as "aging") and changes in exciter lamp brightness. The automatic gain control of this invention maintains proper operating conditions in spite of gain variations introduced from the sources just named.

Figure 2:
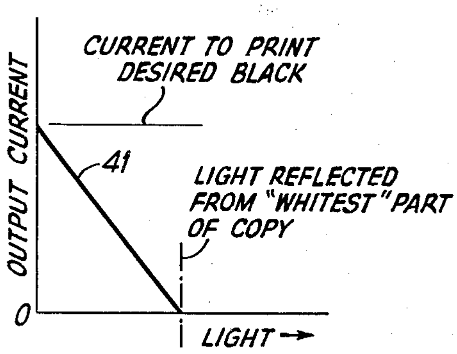
Figure 3:
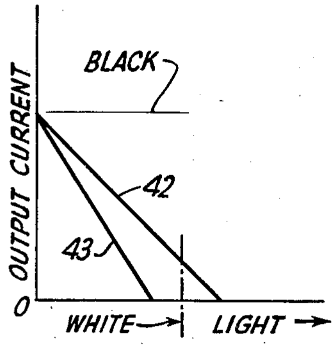

Figs. 2 to 5 of the drawings show three fundamental changes or adjustments that can be made in the system of Fig. 1. In Fig. 2, the curve 41 shows the normal condition. Values of output current vs. light falling on the phototube are plotted. If the gain is changed as in Fig. 3, the slope of the curve 41 is changed, the curve pivoting around the zero light—maximum current point. If the gain is too low, the background of the recorded copy will be gray. This condition is shown by curve 42. If the gain is too high, gray parts of the copy will be white, giving a "washed out" effect. Curve 43 illustrates the condition when the gain is too high. It is to be noted that changing the gain does not effect the "black" current.

Figure 4:
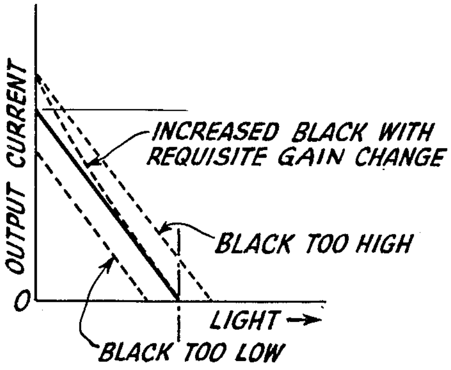

If the black current is changed as in Fig. 4, two effects will be noted. The black portion of the recorded copy will be gray or too black (burned) and the gain will be no longer correct and will have to be adjusted. The black adjustment affects the white adjustment and emphasizes the need for the automatic gain control of the invention.

Figure 5:
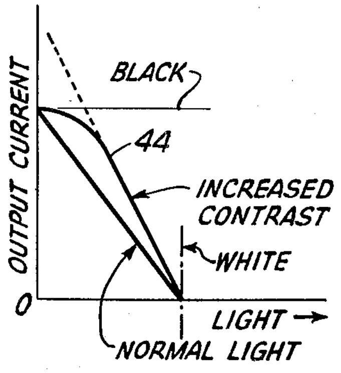

The third adjustment is the possibility of increasing contrast by altering the light vs. output current relation. Fig. 5 shows such a condition. The result is accomplished by increasing the black current value towards which the system tends when light is reduced from maximum, and then limiting the actual maximum current to the desired value. This is, in effect, causing saturation on the black end of the curve. The slope of the current vs. light curve 44 at the white end, which denotes gain, must be changed if the contrast is increased. The white control and contrast control are interdependent so that automatic gain control is desirable in this instance.

Fig. 1 of the drawings shows, by way of example, a system in which the phototube 20 drives the output stage directly. The electron multiplier phototube 20 may, for example, be the commercially available type 931-A multiplier phototube which is of the electrostatically focused type. The photocathode 51 of the phototube is connected to the negative terminal of a suitable high voltage D. C. source 52. For the type of phototube mentioned by way of example, the voltage across the terminals of the source 52 is to be approximately 1300 volts. The anode 53 of the phototube is connected to the grids 54 and 56 of a pair of output tubes 59 and 60. The anodes of the output tubes 59 and 60 are connected to a suitable source of positive voltage 61 which may be the low voltage supply indicated by reference character 62. The voltage at the anode of the tube 60 is designated $E_3$ in the following description. The screen grids 63 and 64 of the output tubes 59 and 60 are connected to an adjustable source of positive voltage as indicated diagrammatically at 65. The voltage at this point is designated $E_1$. The low voltage D. C. supply 62 and the high voltage D. C. supply 52 may be connected to alternating current service mains indicated at 66. The cathodes of the output tubes are connected to the printer bar 39 and the helix 38 is connected to a suitable part of the recorder and is grounded as indicated at 67. The voltage at the helix 38 is designated $E_6$.

A tube 68 is connected in series with the high voltage D. C. supply source 52. The cathode 69 of this tube is connected to a source of positive potential such, for example, as one of the terminals of the source 62 or a suitable voltage divider therein, one end of which is grounded as indicated by reference character 71. Adjustability of the voltage applied to the cathode 69 is indicated at 72. This voltage is designated $E_4$. The combined diode-triode tube 73 is connected so that its triode section acts as a cathode follower having a cathode resistor 75 serving as a load resistor. The diode anode 76 of the tube 73 is connected to the control grid 78 of the tube 68.

Added details of the system of Fig. 1 as well as the manner in which it functions will now be described in detail.

When no light is reflected on to the cathode 51 of the phototube 20, no anode current is drawn and the grid voltage of the output tubes 59 and 60 is the positive voltage $E_2$ applied as indicated by reference character 85. This connection is adjustable and may as stated in connection with other parts of the circuit be a voltage divider in the low voltage power supply 62. This condition holds unless the voltage $E_2$ is greater than the voltage $E_6$ at the printer bar 39 which is the output voltage of the tubes 59 and 60. This is the "black" output voltage and is set by adjusting the voltage $+E_1$ applied at 65 to give saturation current which produces the desired marking in black of the copy when the grid-to-cathode voltage of the tubes 59 and 60 is substantially zero. Assuming that $+E_2$ is equal to the grid voltage on the output tubes 59 and 60 which just produces substantially zero grid-to-cathode voltage, any current drawn by the phototube 20 under light excitation and available at anode 53 will produce a voltage drop across a resistor 88 which will reduce the output current. A certain predetermined current flow through in the resistor 88 will reduce the output of the tubes 59 and 60 substantially to zero. This constitutes the above stated selected "white" condition and no marks are produced on the record sheet. When this current value is made to correspond to the light value received by the cathode 51 from the white part of the subject copy 16, the gain is set correctly.

Automatic gain control in accordance with the invention is accomplished by varying the total voltage supplied to the dynodes 89 of the phototube 20. The gain of an electron multiplier can be varied through a wide range by voltage control. The total voltage applied to the phototube 20 is adjusted in the illustrative embodiment by inserting the plate circuit of the tube 68 in series with the divider circuit, constituting the resistors 91 across the multiplier, and its power supply 52, as an adjustable resistance.

In operation of the gain control feature a voltage $E_7$ is derived from the grid voltage of the output tubes 59 and 60 by the triode section of the tube 73. The triode section constitutes the anode 94, the grid 98 and the cathode 99 of the tube 73. This voltage $E_7$ is the output voltage of the triode section of the tube 73 operating as a cathode follower. The low impedance circuit of the triode section of the tube 73 thus contains a replica of the printer voltage, which is to some extent isolated from the printing circuit, so that momentary short circuits of the printer bar 39 and the helix 38 do not appear as a zero-resistance connection to ground of the point used as a reference and so do not give false indication of sufficient gain.

The voltage $E_7$ thus dips toward zero with respect to ground when "white" is being scanned. If the gain is too great, the voltage $E_7$ will approach zero very closely, but if the gain is too low, this voltage will still be quite appreciable. These minimum excursions of $E_7$ are indicative of whether the gain setting is correct, and are utilized by the diode section of the tube 73 and an RC circuit comprising a resistor 101 and a capacitor 102 to adjust gain.

The cathode 69 of the tube 68 is operated at a D. C. voltage $E_4$ which is approximately equal to the voltage $E_7$ which exists when the desired white condition is obtained in the printing circuit, plus a small additional voltage. Assuming a condition when gain happens to be so low that $E_7$ never drops as low as $E_4$, then the voltage on the grid 78 will gradually tend toward $E_4$. This condition will have the effect of decreasing the resistance constituting the plate circuit of the tube 68, increasing voltage on the multiplier of the phototube 20 and increasing gain of the system. At a time in this slow drift toward zero bias on the grid 78 of the tube 68, gain will have risen sufficiently so that on white portions of the subject copy 16, the voltage $E_7$ will dip below the voltage $E_4$ and current will be drawn by the diode section of the tube 73 from the circuit combination 101 and 102 tending to reduce gain. An equilibrium point will be reached with white portions of the subject copy being rendered in the desired white value on the record sheet. Changing $E_4$ will adjust the minimum excursions of output current and is thus a "white" control. The ratio of the resistance value of the resistor 101 to the resistance value of the resistor 75 should be of the order of 200 to 1, in order that a small percentage of white in the copy will be sufficient to keep gain properly adjusted.

$E_5$, the voltage applied to the screen grid 104 of the tube 68, is preferably low in value which gives a sharp cut-off on the control grid 78 of the tube 68 thus improving sensitivity. The load current is low and the drop in the space discharge path of the tube 68 is reasonably low when this tube operates at zero bias.

If $E_2$ is set higher than the voltage on the grids 63 and 64 which produces substantially zero grid-to-cathode voltage as determined by $E_1$, the grids 63 and 64 will draw sufficient current through the resistor 88 to maintain them at substantially the cathode voltage $E_6$, since their resistance to cathode in the positive grid region is much lower than the resistance value of the resistor 88. Under these conditions when the phototube anode 53 draws small amounts of current, the current is merely diverted from the grids 63 and 64 and does not change the grid voltage appreciably. Thus, the output current remains on the "black" level until the phototube 20 diverts all of the current from the grids 63 and 64 to its own anode 53. Any further increase in multiplier current then reduces the grid voltage on the grids 63 and 64 and reduces the output current. This situation is illustrated in Fig. 5 of the drawings and is a condition of high contrast.

Solely by way of example, the following types of tubes may be employed in the illustrative arrangement of Fig. 1. The phototube 20 may be a 931-A multiplier phototube which is a nine stage electrostatically focused type. The output tubes 59 and 60 may be type 6L6. The double purpose tube 73 may be a type 6SR7. The tube 68 which is in series with the high voltage power supply 52 may be a type 807. With this tube complement indicated by way of example, the voltage $E_3$ may be +400 volts and the voltage $E_5$ may be +25 volts.

Also, by way of example, it may be pointed out that with the suggested tube complement, the value of the resistor 75 must not be less than about 10,000 ohms without exceeding ratings on the tube 73 when it is a type 6SR7. The resistance value of resistor 101 needs to be at least 2 megohms. A resistor 108 keeps the drop across the tube 68 to a safe maximum. A resistor 109 is connected between the anode of the tube 59 and the anode of the tube 60. By way of example, this resistor may have a value of about 39 ohms.

Having now described the invention, what is claimed and desired to be secured by Letters Patent is the following:

1. A facsimile signalling system comprising a scanner having means including an electron multiplier phototube for generating signals representing the scanning of subject matter, an output circuit for said phototube including a resistor, an electron tube comprising a cathode, an anode, and a control electrode, said control electrode being coupled to said output circuit, diode rectifying elements coupled to the output circuit of said tube, a time constant circuit comprising a resistor and a capacitor in parallel combination, a connection from the anode of said diode to one terminal of said capacitor and resistor combination, a control tube comprising a cathode, an anode and a control grid, a connection from said control grid to the anode of said rectifier section, a connection from the other terminal of said capacitor and resistor combination to the cathode of said control tube, a high voltage supply source for the electron multiplier section of said phototube, the cathode-anode circuit of said control tube being included in series between said electron multiplier section and said power supply source, means to apply a biasing voltage to the cathode of said control tube, said biasing voltage being approximately equal to the voltage developed in the output circuit of said first named electron tube whereby when maximum light falls on said phototube from the subject copy, current will be drawn by said rectifier to increase the impedance of said control tube thereby to reduce gain.

2. A facsimile signalling system comprising a scanner having means including an electron multiplier phototube for generating signals representing the scanning of subject matter, an output circuit for said phototube including a resistor, an electron tube comprising a cathode, an anode, and a control electrode, said control electrode being coupled to said output circuit, diode rectifying elements coupled to the cathode of said tube, a control tube comprising a cathode, an anode and a control grid, a connection from said control grid to the anode of said rectifier section, a time constant circuit comprising a resistor and a capacitor connected in parallel, one terminal of said parallel combination being connected to the grid of said control tube, the other terminal of said combination being connected to the cathode of said control tube, a high voltage supply source for the electron multiplier section of said phototube, the cathode-anode circuit of said control tube being included in series between said electron multiplier section and said power supply source, means to apply a variable biasing voltage to the cathode of said control tube, said biasing voltage being set approximately equal to the voltage developed in the output circuit of said first named electron tube whereby when maximum light falls on said phototube from the subject copy current will be drawn by said rectifier to increase the impedance of said control tube thereby to reduce gain.

3. A facsimile signalling system comprising a scanner having means including an electron multiplier phototube for generating signals representing the scanning of subject matter, an output circuit for said phototube including a resistor, an electron tube comprising a cathode, an anode, and a control electrode, said control electrode being coupled to said output circuit whereby said tube develops a control voltage output, a control tube comprising a cathode, an anode and a control grid, a connection from said control grid to the control voltage output of said first named tube delay circuit, one terminal of said delay circuit being connected to the grid of said control tube, the other terminal of said delay circuit being connected to the cathode of said control tube a high voltage supply source for the electron multiplier section of said phototube, the anode-cathode circuit of said control tube being included in series between said electron multiplier section and said power supply source, means to apply a biasing voltage to the cathode of said control tube cathode, said biasing voltage being approximately equal to the voltage developed in the output circuit of said first named electron tube whereby when maximum light falls on said phototbe from the subject copy current will be drawn from said delay circuit to increase the impedance of said control tube thereby to reduce gain.

HAROLD E. HAYNES.

REFERENCES CITED

The following references are of record in the file of this patent:

UNITED STATES PATENTS

| Number | Name | Date |
|---|---|---|
| 1,820,335 | Von Bronk | Aug. 25, 1931 |
| 1,925,608 | Round | Sept. 5, 1933 |
| 2,063,694 | Moller | Dec. 8, 1936 |
| 2,198,233 | Snyder | Apr. 23, 1940 |
| 2,205,072 | Skellet | June 18, 1940 |
| 2,280,303 | Reynolds | Apr. 21, 1942 |
| 2,315,362 | Wise | Mar. 30, 1943 |
| 2,397,559 | O'Brien | Apr. 2, 1946 |
| 2,412,423 | Rajchman et al. | Dec. 10, 1946 |
| 2,454,169 | Haynes | Nov. 16, 1948 |